July 5, 1960
T. E. LOHR ET AL
2,944,188
AUTOMATIC LIGHT CONTROLLED HEADLAMP MEANS
Filed April 10, 1958
3 Sheets-Sheet 1
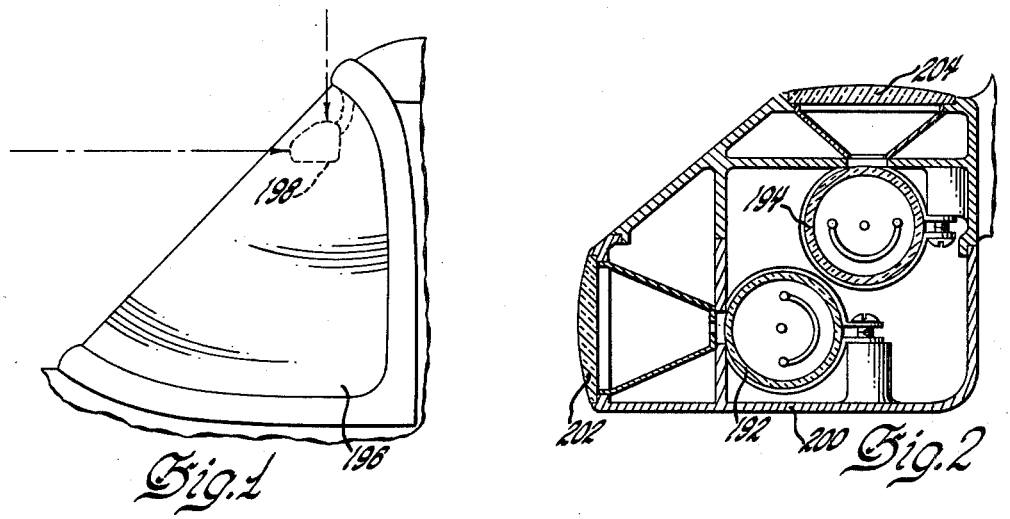
Fig.1
Fig.2
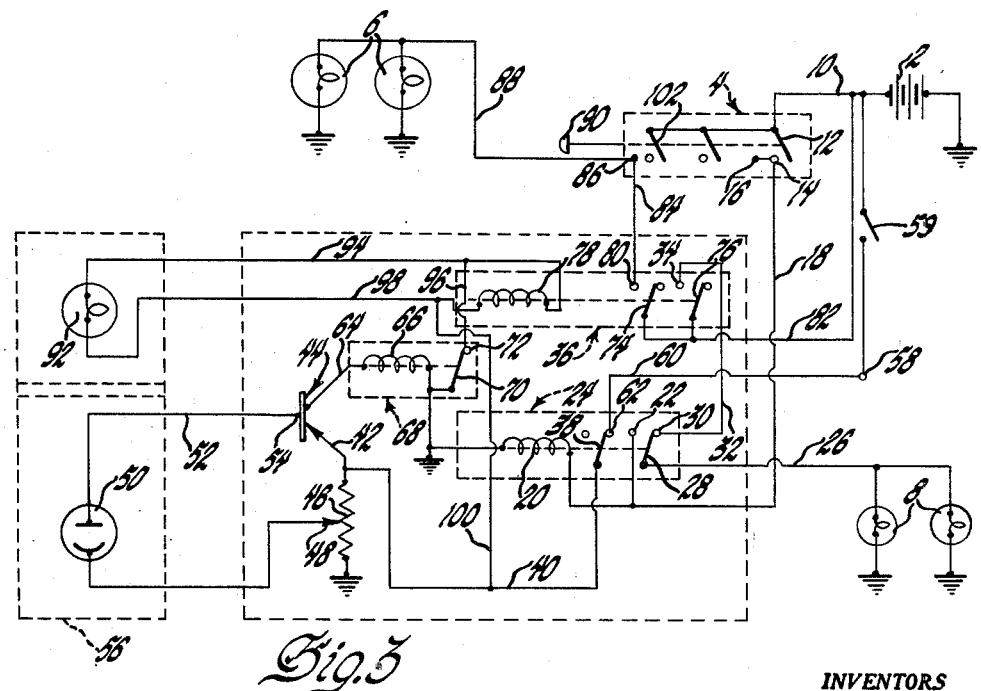
Fig.3
INVENTORS
Thomas E. Lohr, &
BY George B. Horton
ATTORNEY

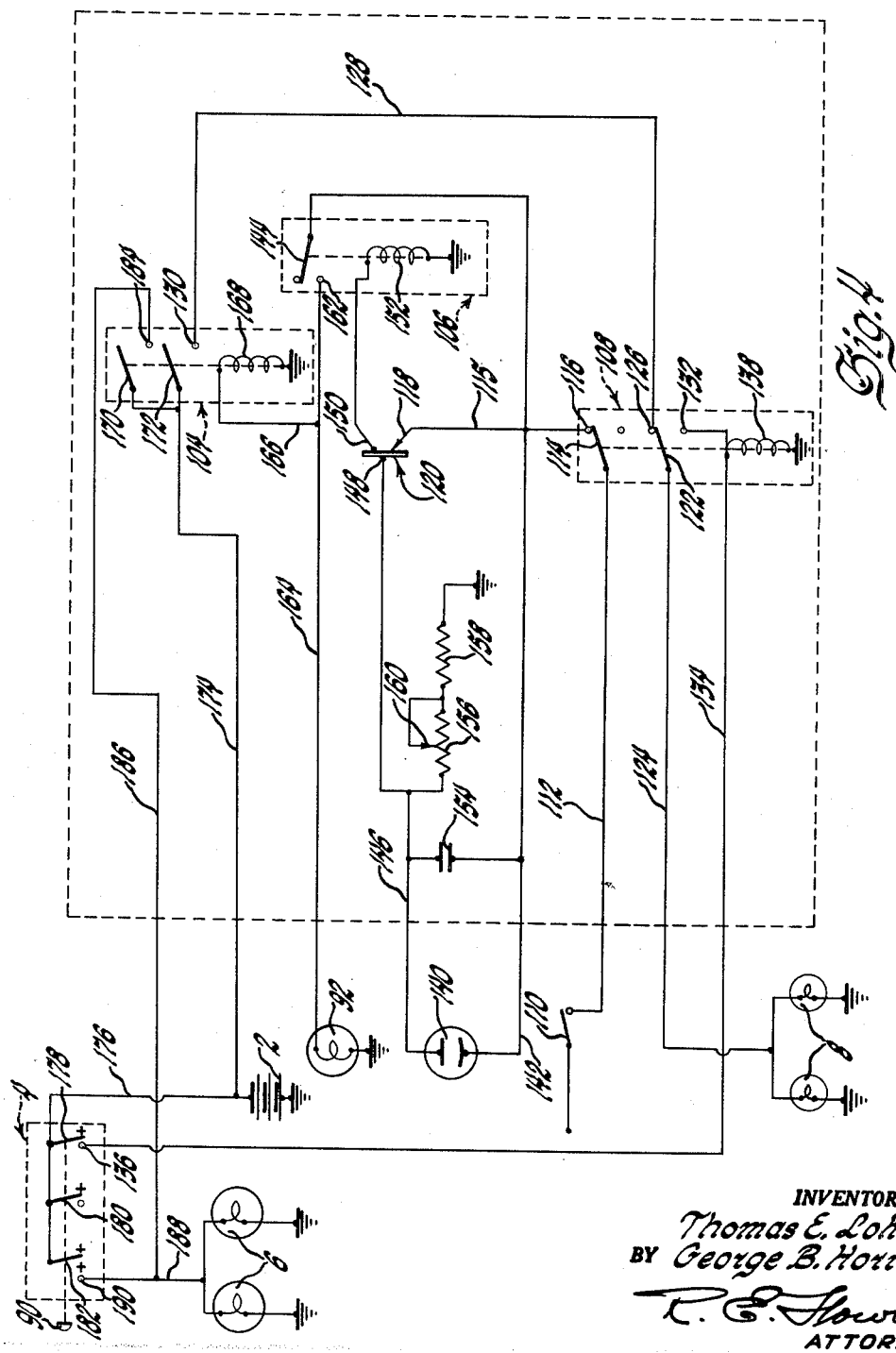

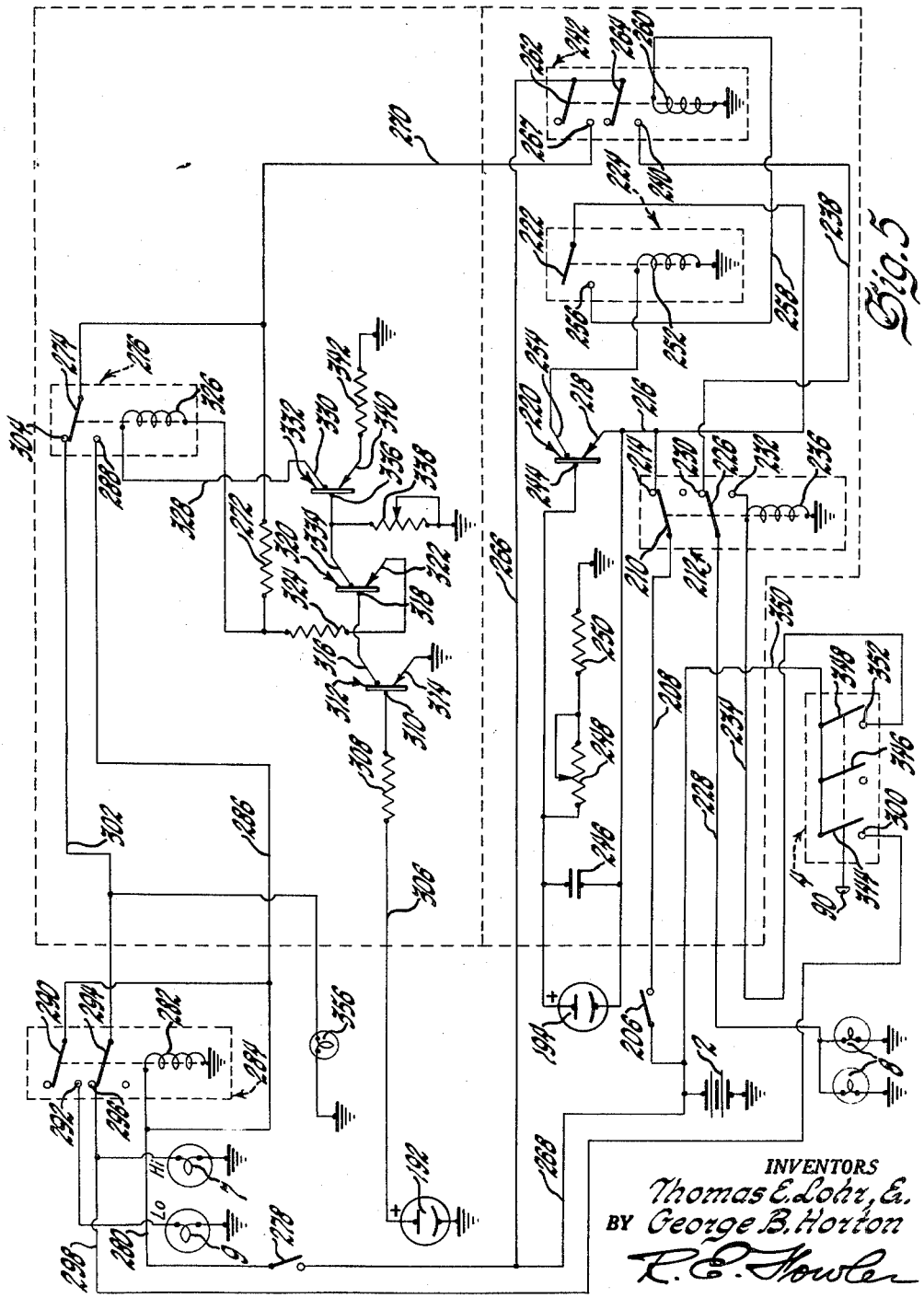

United States Patent Office 2,944,188
Patented July 5, 1960

2,944,188
AUTOMATIC LIGHT CONTROLLED HEADLAMP MEANS

Thomas E. Lohr, Detroit, and George B. Horton, Garden City, Mich., assignors to General Motors Corporation, Detroit, Mich., a corporation of Delaware Filed Apr. 10, 1958, Ser. No. 727,634

2 Claims. (Cl. 315—83)

This invention relates to light sensitive control means for lighting equipment on automotive vehicles. As dusk approaches, it is of course necessary in the operation of automotive vehicles to turn on the headlights and other warning lights of the vehicle for safe operation. After the headlights have once been energized, it is further necessary to dim or place the headlight beams on low beam in order to avoid blinding approaching drivers for safe passing. There are currently on the market light sensitive means for automatically causing the headlights to switch to low beam when incident light strikes the front of the vehicle from a certain direction and of a certain intensity. By the use of such a system, the driver is relieved of the necessity of manually switching back and forth between low beam and high beam upon the operation of the motor vehicle on suburban or country highways.

It would be advantageous to provide means in an automotive vehicle for also turning on the lighting system of the car as the amount of daylight fades so that the driver would also be relieved of this chore, which, while it may seem relatively simple, is often postponed and the car operated in semi-darkness when the lights should be on. As a safety factor alone, this would be of great assistance.

It is therefore an object in making this invention to provide light sensitive control means for use in an automotive vehicle to initially energize the lighting system upon a decrease in ambient light.

It is a further object in making this invention to provide a light controlled system for switching on or off a vehicle lighting system which can be simply and effectively combined with the normal manual lighting switching means so that that portion may be actuated at any time by the operator.

It is a still further object in making this invention to provide a light sensitive control system for controlling the lighting system of an automotive vehicle which not only switches the lighting system on as the amount of ambient light decreases, but, in addition, controls the intensity of the headlight illumination dependent upon the approach of the vehicles.

With these and other objects in view which will become apparent as the specification proceeds, the invention will be best understood by reference to the following specification and claims and the illustrations in the accompanying drawings in which:

Figure 1 is a side view of the forward windshield section of an automotive vehicle with our combined control element shown in place.

Figure 2 is an enlarged sectional view of a compound light sensitive control element for use with our system.

Figure 3 is a circuit diagram of a light sensitive control system for turning on and off the lights of an automotive vehicle dependent upon ambient light intensity.

Figure 4 is a circuit diagram of a modified light sensitive control system similar to that shown in Figure 3 but incorporating a a time delay feature to prevent cycling if the amount of ambient light is suddenly changed, and Figure 5 is a circuit diagram of a compound light control system for an automotive lighting system which not only turns on and off the system, depending upon ambient light, but also causes the headlights to be dimmed upon the approach of vehicles.

Referring now more particularly to the circuit diagram shown in Figure 3, as indicated in the brief description of this figure, there is shown therein a light sensitive control circuit for turning on and off the illumination system of a vehicle depending upon the amount of ambient illumination. In this figure, there is shown the conventional storage battery 2 ordinarily found in a car, which has one terminal connected to the conventional manual lighting switch 4, for controlling the lamps. There also is shown a pair of headlamps 6 and a pair of tail lamps indicated at 8 whose energization it is desired to control. It is to be understood, of course, that while a pair of headlamps and tail lamps is shown, this is merely illustrative and that any number of either headlamps or tail lamps can be controlled by our system. The battery 2 has one terminal connected directly to ground and a second terminal through conductor 10 to the movable switch including armatures 12 in the manual switch 4.

Movable switch arm 12 is adapted to engage a plurality of stationary contacts 14 and 16 in sequence as the switch is moved to the left. In this particular instance, these two contacts are conductively connected together. Contact 14 is connected through conductor 18 to one terminal of a relay control coil 20, the opposite terminal of which is grounded. Conductor 18 is also connected through a tieline to stationary contact 22 of a compound switch 24 actuated by said relay coil 20. The tail lights 8 have one terminal grounded and are commonly connected through conductor 26 with one of the armatures 28 of the switch 24. Armature 28 is adapted to move between stationary contacts 22, previously described, and stationary contact 30. Contact 30 is connected through conductor 32 with a stationary contact 34 of a relay control switch 36.

Switch 24 is also provided with a second movable armature 38, which armature moves in unison with armature 28 and is mechanically linked therewith for operation by relay coil 20. Armature 38 is connected directly through conductor 40 with the emitter electrode 42 of the transistor 44. The emitter 42 is connected directly to ground through a biasing resistor 46. An adjustable tap 48 on said resistor 46 is directly connected to one side of a light sensitive cell 50 such, for example, as a selenium cell. The other terminal of the cell 50 is connected through conductor 52 to the base electrode 54 of the transistor 44. This circuit therefore determines the base-emitter input to the transistor 44.

The light sensitive cell is mounted in some satisfactory housing, indicated by the dash line enclosure 56, which is placed on the vehicle so as to have incident ambient light impinge thereon. The ordinary ignition circuit through the ignition key on the instrument panel is connected to terminal 58 so that when the ignition switch 59 is closed, this circuit will be directly connected to the battery. This contact is connected through line 60 to stationary contact 62 on relay switch 24. The collector electrode 64 of transistor 44 is directly connected to one terminal of the operating coil 66 of the control relay 68, the opposite terminal of which is grounded. The opposite terminal is likewise connected to movable switch armature 70 actuated by said coil 66 which is adapted to engage stationary contact 72 when the relay coil is de-energized and to be moved away from this contact when the relay coil is energized. Thus, the amount of light falling on the photocell 50 controls the conduction through the transistor 44, which, in turn, controls the current flow through the relay operating coil 66.

The control relay 36 includes two ganged armature means 74 and 76 and these armatures are actuated toward the left in Figure 3 by energization of the relay coil 78. Armature 76 is adapted to engage stationary contact 34 when in its lefthand position and armature 74 to engage stationary contact 80 when in a like position. Both armatures 74 and 76 are commonly connected to conductor 82 which extends directly to one terminal of the battery 2. Stationary contact 80 of the relay switch 36 is connected directly to tieline 84 which extends to a stationary contact 86 on the manual lighting switch 4, and which is also directly connected to one side of the headlamps 6, through line 88, the opposite side of said headlamps being grounded. All of the armatures actuated by the hand knob 90 of switch 4 are commonly connected together, and to one pole of the battery 2. An indicating lamp 92 located adjacent the driver's panel is adapted to be illuminated when the system is energized to advise the driver that the headlamps had been turned on. This lamp 2 is connected by conductor 94 to one terminal of the relay coil 78 and also through tieline 96 with contact 72 of relay 68. The other side of the indicating lamp is connected through conductor 98 to the remaining side of the actuating winding 78 and also through a tieline 100 with line 40 which carries battery voltage when the ignition switch is turned on.

Assuming that the operator has entered the car upon which this control system is mounted and has turned on the ignition switch, battery voltage is applied to line 60 and through contact 38 to line 40 which applies a proper bias to the emitter electrode 42 of the transistor 44. If, at this time, a sufficient amount of daylight exists, that lights are not needed, the bias across the base emitter electrodes of the transistor produced by the photocell is sufficient to permit current to flow through the transistor of sufficient size to energize coil 66. This circuit is from line 60, switch arm 38, line 40, emitter 42, through the transistor body, collector 64 and coil 66 to ground. This causes armature 70 to be attracted toward the left, breaking contact with contact 72 and thus removing the ground connection for relay coil 78. This coil is therefore deenergized and relay 36 releases its armatures 74 and 76 to the right so that there is no energizing circuit completed to either the headlamps or the tail lamps.

If the amount of light is reduced to a point where illumination is needed for vehicle operation, the photocell cuts down on the base-emitter bias and the current flow through the transistor 44 is reduced to such a point that the relay coil 66 releases its contact, and armature 70 moves again into engagement with contact 72. This completes an energizing circuit for the relay coil 78 as follows: line 60, switch arm 38, line 40, line 100, coil 78, line 96, contact 72, armature 70 to ground. It simultaneously provides energy to the indicating lamp 92 and that is now lit. Energization of coil 78 causes it to move contacts 74 and 76 to the left completing circuits for energization of both headlamps and tail lamps. Thus, the amount of ambient light in the vicinity of the automobile determines whether or not the headlamps and tail lights shall be illuminated.

If it is desired to manually control the illumination of the lights, the operator may pull the knob 90 to the left which closes an obvious circuit from the battery to the headlamps 6. This action also completes a circuit to the tail lamps and simultaneously opens the power circuit to the transistor. The circuit to the tail lamps from the power source when under automatic operation is completed through armature 28 of relay 24. Also armature 38 of this same relay is directly in the main power supply line from the ignition switch 58 to the amplifying transistor. If the operator manually pulls the knob 90 to the left, the lefthand armature 102 completes a circuit to the headlight filaments. Simultaneously, switch 12—14 closes on the righthand end of the switch which completes a circuit from the battery through line 18 and through operating coil 20 to ground. Coil 20 attracts the two armatures 38 and 28 to the left, the operation of armature 38 breaking the power supply to the transistor. The movement of arm 28 to the left completes another energizing circuit for the tail lamps or other auxiliary lighting equipment from the battery line 10, armature 12, contact 14 or 16, line 18, contact 22, armature 28, line 26 through lamps 8 to ground. Thus, when the operator desires to utilize manual operation, he does so merely by pulling the conventional light switch to illuminate both the headlamps and tail lamps and simultaneously deenergize or remove the power from the automatic control.

Referring now to Figure 4, which discloses a modified circuit for turning on and off illuminating apparatus on a vehicle dependent upon the amount of ambient light, this circuit is similar to that shown in Figure 3 but includes two additional features. Figure 4 includes a time delay switch for maintaining the switching means in a given position for a predetermined time to overcome flashing of the lights in the advent of a sudden change in ambient illumination. Figure 4 also includes a sensitivity control for adjusting the sensitivity of said system. Referring now specifically to the showing of Figure 4, this circuit includes the same type of manual control switch 4 as that shown in the first instance which controls the flow of current to headlamps 6. Vehicle battery 2 is also shown as well as tail lamps or other auxiliary lamps 8 which it is desired to energize simultaneously with the headlamps. In this case, three control relays are shown at 104, 106 and 108.

In this instance, switch 110 actuated by the operation of the ignition switch and is connected to line 112 which extends to armature 114 of the relay 108. This armature is adapted to engage a stationary contact 116 when in the back or released position. Contact 116 is directly connected to emitter electrode 118 of the amplifying transistor 120. This applies proper operating potential to the emitter. Second armature 122 of the relay 108 is connected directly through line 124 to the auxiliary lamps or tail lamps 8. Stationary contact 126 adapted to be engaged by the armature 122 when in its released or back position is connected through conductor 128 with stationary contact 130 of the relay 104. A second spaced stationary contact 132 of switch 108 is also adapted to be engaged by armature 122 when in its foremost or attracted position. Contact 132 is connected through conductor 134 with a stationary contact 136 on the manual switch 4. Line 134 also is directly connected to one terminal of the operating coil 138 of relay 108, the other terminal of which is grounded.

The photocell 140 has one terminal connected to conductor 142 which extends to movable armature 144 of control relay 106. Conductor 142 is also connected to line 115 which extends from contact 116 to emitter 118. The remaining terminal of the photocell 140 is connected through conductor 146 to the base electrode 148 of transistor 120. The collector electrode 150 of said transistor is connected directly to one terminal of the operating coil 152 of the control relay 106 whose remaining terminal is connected directly to ground. A timing condenser 154 is connected directly across between lines 142 and 146 and tends to maintain a given voltage difference between these two lines. Two resistances 156 and 158 are connected in series between line 146 and ground. Resistance 156 is variable by moving adjustable tap 160 over the surface thereof. This provides the proper base bias for the transistor and variation of this resistance changes the sensitivity of the amplifier.

Armature 144 is adapted to engage stationary contact 162 in its forward or attracted position when moved to this position by energization of the relay coil 152. Stationary contact 162 is connected through conductor 164 with one terminal of an indicating light 92, the opposite terminal of which is grounded. Line 164 is connected through tieline 166 with one terminal of operating coil 168 of the relay 104, the opposite terminal of which is grounded. Thus, closure of switch 144, 162 causes energization of coil 168. Relay 104 includes the movable armatures 170 and 172 which are moved by energization of the coil 168. Armature 170 is directly connected to armature 172 electrically and together they are commonly connected through conductor 174 to one side of the battery 2. This same battery terminal is connected through line 176 with a plurality of movable armatures 178, 180 and 182 in the manual switch 4. Armature 172 of the relay 104 is adapted to engage stationary contact 130 when in its energized position and armature 170 is adapted to engage stationary contact 184 when in the same energized position. Contact 184 is connected directly through line 186 to line 188 which extends from a stationary contact 190 of the manual switch 4 to the headlight filaments 6.

In the operation of this circuit, it is again assumed that the ignition switch 110 is closed. This similarly completes an energizing circuit for applying the proper voltage to the transistor. In the absence of sufficient ambient light, the photocell provides a sufficient operating voltage for the base-emitter circuit so that the transistor conducts a sufficient amount of current to energize coil 152. It, therefore attracts its armature 144. The contact of the armature 144 with stationary contact 162 completes an energizing circuit for the indicating light 92 and also for the relay coil 168 of relay 104. Coil 168 attracts both armatures 170 and 172 so that they engage stationary contacts 184 and 130 respectively. This completes an obvious circuit to the headlamps 6 to cause energization of the same. Therefore, as long as the light level is below a certain minimum, the headlights are supplied with power. The closure of switch 172—130 also completes an energizing circuit for the tail lights or auxiliary lights 8. This circuit is through armature 122 of relay 108 which is deenergized at this time and rests against its back contact.

If the amount of light falling on the photocell 140 increases to a sufficient point, the bias on the base 148 cuts down the flow of current through the transistor and therefore through relay coil 152 until it releases its armature 144 to cause an opening of switch 144—162. This causes a breaking of the several circuits to the headlights and tail lights and they are turned off. As mentioned before, this circuit includes condenser 154 which is connected in shunt to the photocell 140. The potential across this condenser therefore is the same as that across the photocell. If this potential tends to change quickly, the condenser acts to slow up this change and tends to keep the voltage at its previous value. Therefore, any sudden changes in light intensity such as might cause a switching or a flashing of the lights, is prevented. Such a flashing might be caused by the car proceeding under a bridge at some time near twilight when the device is just about ready to switch on the headlights. This might decrease the ambient illumination enough to cause the lights to be switched on, but when the vehicle again proceeded out into the open it might tend to turn them off again. This condenser would prevent such a switching for a predetermined time so that unless the ambient light intensity remains in its new value, for such time period, no switching will be accomplished.

As in the previous circuit, the lights can at any time be controlled manually by operation of a knob 90 of the manual switch 4. As in the circuit shown in Figure 3, actuation of the knob 90 to the left closes a direct circuit to the headlamps 6 and at the same time energizes coil 138 of relay 108 to apply power to the tail lamps 8 through armature 122 and contact 132, and simultaneously opens the power supply circuit to the controlling transistor. This action has been fully described with respect to the circuit shown in Figure 3.

Both circuits of Figures 3 and 4 turn on and off the various lamps of lights of the vehicle depending upon the intensity of the ambient light. As before mentioned, equipment is currently on the market for automatically dimming headlamps of a vehicle during night operation so that the driver may be relieved of this chore. The circuit shown in Figure 5 is a compound control circuit which not only turns on the headlamps as dusk approaches, but also causes them to be automatically dimmed upon the approach of an oncoming vehicle when the vehicle is being operated at night. Obviously, such a compound control system must be equipped with two different light sensitive means. One of these cells must be directed to be affected by general ambient light intensity and the other must be carefully focused to be responsive only to light intensity from a predetermined portion of the highway in advance of the car and not to the other illumination.

In the circuit of Figure 5, therefore, there are provided two different light sensitive cells 192 and 194. The cell 192 is utilized to control the automatic dimming portion of the control system whereas the cell 194 is utilized to turn the lights on and off at dusk or dawn. Figure 1 shows a windshield 196 of a vehicle behind which the light sensitive pickup assembly 198 is mounted. Both of the light sensitive cells are mounted within a single housing which is best shown in section in Figure 2. The housing 200 has one lens system 202 in the lefthand lower section which focuses the incident light from the highway on photocell unit 192 for automatic dimming. The second light sensitive cell 194 is mounted above the cell 192 and the casing 200 supports a second concentrating lens 204 for focusing ambient light from the sky upon the photocell 194 for turning the system on and off. Thus, the two cells look in directions at 90° to each other and the cell 194 does not respond to illumination from oncoming headlights but only from sky illumination. Conversely, cell 192 is only influenced by incident light from headlamps and not in general from ambient illumination.

The circuitry associated with these two cells consists in the main of two sections. The section for switching the headlights and other lights on the vehicle on at dusk and off at dawn, is shown in the bottom half of the circuit and the circuit for automatically dimming the headlights upon the approach of a vehicle shown at the top. The vehicle battery is shown at 2 as in previous instances. The headlamps are shown as upper and lower beam filaments 7 and 9 respectively, only one single filament being shown as illustrative of both headlamps. These filaments may be in the same or in separate reflective housings as desired. The tail lamps are shown at 8. Switch 206 is actuated by the ignition switch of the car and is closed when the ignition is turned on. Switch 206 is connected through line 208 to armature 210 of the switching relay 212. Armature 210 engages stationary contact 214 in its back or released position. Contact 214 is connected through conductive line 216 with the emitter electrode 218 of the transistor 220 and also to movable armature 222 of switching relay 224. A second armature 226 of relay 212 is ganged to move with armature 210 and is connected through conductor 228 directly with one terminal of tail lamps 8. The other terminals of the tail lamps are grounded. Armature 226 oscillates between fixed contacts 230 and 232. Contact 232 is connected through conductor 234 with contact 352 on manual switch 4 and also to one terminal of the operating coil 236 of the relay 212. The remaining terminal of the operating coil is grounded. Stationary contact 230 is connected through line 238 to a stationary contact 240 of relay 242.

As in Figure 4, the light cell 194 is connected directly across the base 244 and emitter 218 electrodes of the transistor 220. Condenser 246 is connected in shunt to the light cell 194 and provides a suitable time delay to prevent light flashing. Resistors 248 and 250 are connected in series between base 244 and ground to provide a suitable bias therefor, resistance 248 being adjustable. Relay 224 has an operating coil 252, one terminal of which is grounded and the other connected directly to collector electrode 254 of transistor 220. Thus, the energization of the relay coil 252 is dependent upon the current flow through transistor 220 as adjusted by the photocell 194 in its input circuit. The armature 222 of the relay 224 is adapted to engage a stationary contact 256 when in its forward or attracted position. This contact is connected through line 258 with one terminal of operating coil 260 of the relay 242. The other terminal of this coil is grounded. Relay 242 actuates two armatures 262 and 264. These two armatures are commonly connected together and through conductor 266 to power line 268 extending from one terminal of the battery 2. Armature 262 is adapted to engage a stationary contact 268 when in its forward or attracted position. This contact is connected through conductor 270 with one terminal of a biasing resistor 272 in the automatic headlight dimming portion of the circuit and also to a movable armature 274 in control relay 276.

In the automatic dimming section, power line 268 extends from the battery to a ratchet type switch 278 which changes its condition at each operation to either open or close and remain in that condition until the next actuation. Switch 278 is also connected to line 280 which extends to one terminal of the operating coil 282 of relay 284. The opposite terminal of the coil 282 is grounded. Tieline 286 interconnects line 280 with stationary contact 288 on relay 276 and also to movable armature 290 on relay 284. Armature 290 is adapted to engage stationary contact 292 in its forward or attracted position. Contact 292 is connected directly to one terminal of the lower beam filaments 9, the opposite terminals of which are grounded. Relay 284 also has a second armature 294 which is ganged to and simultaneously movable with armature 290. Armature 294 is adapted to engage stationary contact 296 when in its back or retracted position. Stationary contact 296 is directly connected to through line 298 with one terminal of the upper beam filaments 7 in each lamp, the opposite terminal of said lamp being grounded. Line 298 also extends to stationary contact 300 on the conventional manual switch 4. Armature 294 of control relay 284 is connected through line 302 with stationary contact 304 on control relay 276 which is engaged by the armature 274 when in its retracted or back position.

The photocell 192 which is adapted to control the automatic dimming portion of the system has one terminal connected through conductor 306 and resistor 308 to the base electrode 310 of a first amplifying transistor 312. The emitter electrode 314 of said transistor 312 is directly grounded. The collector electrode 316 of transistor 312 is directly connected to base 318 of a second stage transistor amplifier 320. The emitter electrode 322 of transistor 320 is connected through resistance 324 to one terminal of operating coil 326 of the control relay 276. The remaining terminal of relay coil 326 is connected through conductor 328 to the collector electrode 330 of the third transistor 332. As in the first stage, the collector electrode 334 of transistor 320 is connected directly to base 336 of transistor 332. An adjustable bias consisting of resistance 338 is connected between collector 334 and ground. Emitter 340 of transistor 332 is connected through biasing resistor 342 to ground.

As in previous instances, the conventional manual switch 4 is shown having a manual adjustable knob 90 which can be pulled to the left as shown in the figure. This operation causes the three armatures 344, 346 and 348 to be moved in a clockwise direction about their pivot. All of these armatures are commonly connected through line 350 directly to the battery. When the manual knob 90 is moved, switch arm 344 engages stationary contact 300 to connect the power supply to line 298 to energize the high beam filaments. If switch 278 is closed, the low beam filaments 7 will also be energized. This movement also causes switch arm 348 to engage stationary contact 352 to connect the power supply to line 234 to supply the tail lights 8. By closure of that switch, a line is completed to tail lights 8 as follows: battery 2, line 350, armature 348, contact 352, line 234, contact 232, armature 226, line 228, lights 8 to ground.

In the operation of this system, let it be assumed that the switch 206 has been closed due to the starting of the motor and the normal operation of the vehicle. As before, this applies operating voltage to the amplifying transistor 220. If there is no light, then again the cell 194 will apply such a bias to the transistor 220 that sufficient current flows therethrough to energize relay coil 252 to attract its armature 222. The closure of this switch completes an energizing circuit for actuating coil 260 of relay 242 and it in turn attracts its armatures 262 and 264. The closure of armature 264 with its forward contact 240 closes an energizing circuit to the tail lamps, as follows: battery 2, line 268, line 266, armature 264, contact 240, line 238, contact 230, armature 226, line 228, lamps 8, to ground. The closure of armature 262 on its front contact 268 completes an obvious energizing circuit from the battery to the transistor amplifying section and that section is prepared to provide either upper or lower beams depending upon approaching car lighting conditions. Thus, in the absence of ambient light, the lights of the vehicle are energized.

If no car is approaching from the opposite direction to that in which the vehicle is proceeding, then it is desirable to have the headlights operating on high beam. Therefore, the current flow through transistor 332 is insufficient to cause an energization of the relay coil 326 and it remains deenergized and the armature 274 engages back contact 304, to complete an energizing circuit for the high beam filaments 7. This circuit is as follows: battery 2, line 268, line 266, armature 262, contact 267, line 270, armature 274, contact 304, line 302, armature 294, contact 296, through the high beam filaments 7 to ground. If, now, an oncoming car approaches, changing the output of the photocell 192 to increase the flow of current through transistor 312 and in turn through transistor 332, then the coil 326 is energized and attracts its armature 274 which moves into contact with contact 288. This breaks the circuit to high beam filaments 7 and completes a similar circuit to the low beam filaments 9 and as long as there is sufficient light impinging on the photocell 192 from advancing vehicles, the lights will be kept on low beam. When the light is removed, coil 326 will release its armature 274 and the lights will switch back to high beam. It is to be noted that when line 302 is energized on high beam, an indicating light 356 is also energized as that is connected between line 302 and ground. This indicates that the high beams are illuminated.

If it is desired to override the automatic portion of the control system to switch to low beams from high beam position, the operator may actuate the foot switch 278 to close the same. By closing this switch, an obvious energizing circuit is completed for the relay actuating coil 282 and it therefore attracts armatures 290 and 294. This breaks the circuit between armature 294 and contact 296 to deenergize the high beam filaments and simultaneously completes a circuit between armature 290 and contact 292 to complete an energizing circuit for the low beam filaments. The low beams therefore will remain on as long as switch 278 is closed regardless of the amount of light on the photocell 192. A second manual override is provided by the manual switch 4. By a closure of that switch, a direct circuit is completed to the high beam filaments and to the tail lights and they will be energized regardless of any other conditions of light or darkness.

From the foregoing, it will be clear that we have provided a simple and effective control circuit for turning on automobile headlamps for operation under dark conditions and for, in combination, causing said headlamps to dim upon the approach of oncoming vehicles, together with other associated manual override controls.

We claim:

1. A control system for vehicle lamps comprising, a headlamp control circuit including upper beam and lower beam filaments, a voltage source, a light pick-up unit comprising a casing, first and second lens means mounted in the casing and having axes extending transversely of each other, a first light sensitive device being mounted at the focal point of the first lens means, a second light sensitive device being mounted at the focal point of the second lens means, a support member on the pick-up unit adapted for connection with a vehicle body to position the unit interiorly thereof adjacent the windshield so that the axis of the first lens means extends vertically through the windshield and the axis of the second lens means extends forwardly and horizontally through the windshield, an amplifier coupled with the first light sensitive device and adapted to develop a first control voltage corresponding to the ambient light intensity, relay actuated switching means having an energizing coil connected with said amplifier and having switching contacts connecting said voltage source to said headlamp control circuit when the ambient light intensity is below a predetermined value and disconnecting the voltage source from the headlamp control circuit when the ambient light intensity is above the predetermined value, an amplifier coupled with the second light sensitive device and adapted to develop a second control voltage corresponding to the light intensity impinging thereon from a direction forward of the vehicle and in a horizontal plane, relay actuated switching means having an energizing coil connected with the last-mentioned amplifier and having switching contacts connecting said voltage source to said upper beam filament when the second control voltage is less than a predetermined value and connecting said voltage source to the lower beam filament when the second control voltage is greater than the last-mentioned predetermined value.

2. A control system for vehicle lamps comprising, a headlamp control circuit including upper beam and lower beam filaments, a voltage source, a first light sensitive device and amplifier coupled therewith adapted to develop a first control voltage corresponding to the ambient light intensity, relay actuated switching means having an energizing coil connected with said amplifier and having switching contacts connecting said voltage source to said headlamp control circuit when the ambient light intensity is below a predetermined value and disconnecting the voltage source from the headlamp control circuit when the ambient light intensity is above the predetermined value, a second light sensitive device and amplifier coupled therewith adapted to develop a second control voltage corresponding to the light intensity impinging thereon from a direction forward of the vehicle and in a horizontal plane, relay actuated switching means having an energizing coil connected with the last-mentioned amplifier and having switching contacts connecting said voltage source to said upper beam filament when the second control voltage is less than a predetermined value and connecting said voltage source to the lower beam filament when the second control voltage is greater than the last-mentioned predetermined value, a rear lamp circuit, a manually actuable switch, an auxiliary relay actuated switching means having an energizing coil connected to the voltage source through the manually actuable switch, said switching means including contacts connecting the rear lamp circuit to the headlamp control circuit and including contacts connecting the voltage source to the first-mentioned amplifier when the switching means is deenergized by the manually actuable switch, said switching means also including contacts connecting the rear lamp circuit to the voltage source through the manually actuable switch when the switching means is deenergized by the manually actuable switch, said manually actuable switch including contacts connecting the voltage source to the headlamp control circuit when the switching means is deenergized whereby the headlamp and rear lamp circuits are energized and the first mentioned amplifier is deenergized by the manually actuable switch.

References Cited in the file of this patent

UNITED STATES PATENTS

| | | |
|---|---|---|
| 1,981,985 | Braselton | Nov. 27, 1934 |
| 2,558,969 | Le Croy | July 3, 1951 |
| 2,807,752 | McIlvaine | Sept. 24, 1957 |